United States Patent [19]
Phipps

[11] Patent Number: 5,515,639
[45] Date of Patent: May 14, 1996

[54] FISHING STRIKE INDICATOR APPARATUS

[76] Inventor: Leroy F. Phipps, 2020 W. 1465 N., St. George, Utah 84770

[21] Appl. No.: 430,531

[22] Filed: Apr. 27, 1995

[51] Int. Cl.$^6$ .......................... A01K 85/01; A01K 93/00; A01K 97/12
[52] U.S. Cl. ........................................... 43/17; 43/43.12
[58] Field of Search .................. 43/17, 16, 44.87, 43/44.91, 43.12

[56] References Cited

U.S. PATENT DOCUMENTS

| | | | |
|---|---|---|---|
| 2,121,279 | 6/1938 | Beck | 43/43.12 |
| 3,023,532 | 3/1962 | Gotenty | 43/17 |
| 4,125,957 | 11/1978 | Cunningham | 43/17 |
| 4,236,340 | 12/1980 | Cunningham | 43/17 |
| 4,418,489 | 12/1983 | Mathauser . | |
| 4,466,211 | 8/1984 | Mathauser . | |
| 4,552,318 | 11/1985 | Durham | 43/17 |
| 4,573,281 | 3/1986 | Moisan | 43/17 |
| 4,702,031 | 10/1987 | Sousa | 43/17 |
| 4,939,864 | 7/1990 | Bowles | 43/17 |
| 5,063,373 | 11/1991 | Lindsley . | |
| 5,163,244 | 11/1992 | Rupp . | |
| 5,216,831 | 6/1993 | Halterman, Jr. . | |

Primary Examiner—Jack W. Lavinder
Assistant Examiner—Allyson Abrams

[57] ABSTRACT

A fishing strike indicator apparatus includes a ballast portion, a fishing line receiving portion connected to the ballast portion, and a cam portion connected to the fishing line receiving portion. The ballast portion includes the center of gravity of the apparatus. Portions of the ballast portion, the fishing line receiving portion, and the cam portion are arrayed along a longitudinal axis. A free-end, pole-contacting portion of the cam portion extends laterally to a first side of the longitudinal axis; and an intermediate, pole-contacting portion of the cam portion extends laterally to a second side of the longitudinal axis. The fishing line receiving portion includes a line cam surface adapted to slide against a taut fishing line. Also, the fishing line receiving portion includes notch portions adapted to engage a portion of a slack fishing line. The notch portions of the fishing line receiving portion extend longitudinally along the longitudinal axis. An audible sounding device is optionally located on the ground below the ballast portion, the fishing line receiving portion, and the cam portion. When these components undergo free fall when a fish has struck the fishing line, the audible sounding device provides an audible signal to a fisherman that the fishing line has been struck. An adjustable weight assembly is connected to the ballast portion. The adjustable weight assembly includes a connector for connecting to the ballast portion, a tether assembly connected to the connector, and a weight unit is connected to the tether assembly.

7 Claims, 3 Drawing Sheets

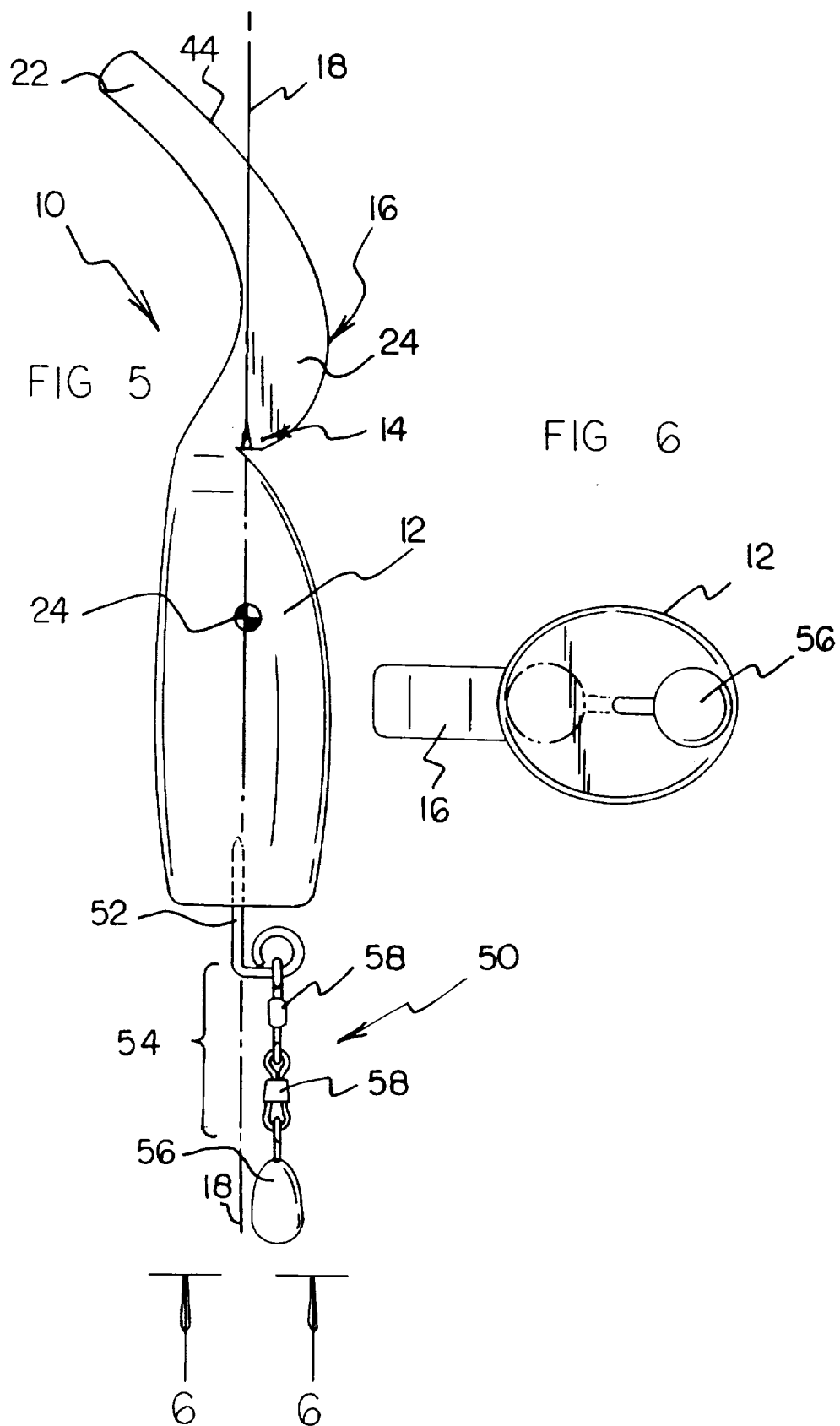

FISHING STRIKE INDICATOR APPARATUS

BACKGROUND OF THE INVENTION

1. Field of the Invention

The present invention relates generally to devices for alerting a fisherman that a fish has struck on the fishing line and, more particularly, to a fish strike alert that senses a change of tension in the fishing line due to the fish strike.

2. Description of the Prior Art

There are certain styles of fishing in which a fishing pole remains in a sedentary position or static position during times before a fish strikes at the line. After the fish strikes, the pole flexes, and the fishing line tightens. In such a style of fishing, a fisherman often stands or sits away from the fishing pole until such time as when a fish strikes. When the fisherman is some distance from the fishing pole, it may be difficult for the fisherman to first notice when a strike occurs. Throughout the years, a number of innovations have been developed relating to devices for alerting a fisherman when a fish strike occurs, and the following U.S. patents are representative of some of those innovations: U.S. Pat. Nos. 4,418,489; 4,466,211; 5,063,373; 5,163,244; and 5,216,831. More specifically, of the patents cited above, U.S. Pat. Nos. 4,418,489, 4,466,211, 5,063,373, and 5,163,244 disclose fisherman alert devices that are connected to the fishing pole. As such, relatively complex elements are required to connect the respective devices to a fishing pole. In this respect, it would be desirable for a fish strike alert to be free of complex connecting elements for connecting a fish strike alert to a fishing pole. Some of the above-cited patents disclose electrically powered devices. Some of the above-cited patents disclose devices that have mechanisms that employ an number of moving parts. To avoid complexity and expense, it would be desirable for a fish strike alert device to be free of electrical components. Also, it would be desirable if a fish strike alert device did not have any moving parts.

U.S. Pat. No. 5,216,831 discloses a removable, reusable fish strike alert that attaches to a fishing line, not a fishing pole. In this device, resilient elements are stretched to permit the device to clamp onto the fishing line. Apparently, motion of the device along the fishing line can visually alert a fisherman that a fish has struck on the line. One result of using this device is that, on a rod and reel apparatus, after a fish has struck, the device may be caught in a ferrule on a fishing rod. Another result of using this device is that, after a fish has struck, the fishing line may move rapidly through the clamped-on device, and a great deal of friction can cause large, harmful heat build up. In these respects, it would be desirable for a fish strike alert that is associated with a fishing line before a fish strikes to disengage from the fishing line after a fish strikes. That is, the ideal fish strike alert line should be substantially non-intrusive—after it does its job of alerting the fisherman to a possible strike, it no longer needs to be considered by the fisherman while in the process of setting a hook or fighting and landing a fish.

Still other features would be desirable in a fishing strike indicator apparatus. Because a fish strike alert is employed near water, it would be desirable for a fish strike alert to be able to float on water if the device inadvertently falls into the water. Aside from providing a visual signal as to the occurrence of a fish strike, it would be desirable if a fish strike alert also could provide an audible signal.

Thus, while the foregoing body of prior art indicates it to be well known to use fishing strike indicator devices, the prior art described above does not teach or suggest a fishing strike indicator apparatus which has the following combination of desirable features: (1) is non-intrusive, i.e. it is free of complex connecting elements for connecting a fish strike alert to a fishing pole; (2) is free of electrical components; (3) does not require the use of moving parts; (4) is associated with a fishing line before a fish strikes and disengages from the fishing line after a fish strikes; (5) able to float on water if the device inadvertently falls into the water; and (6) can provide an audible signal in addition to a visual signal, (7) can permit the fisherman to be in a desired location than would otherwise be possible, e.g. the fisherman does not have to constantly watch his line—he can face away from the sun or the wind as long as his fishing pole remains in his peripheral field of awareness, (8) it takes a relatively brief period of time to reset the fish strike alert for the next fishing cycle. The foregoing desired characteristics are provided by the unique fishing strike indicator apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing strike indicator apparatus which includes a ballast portion, a fishing line receiving portion connected to the ballast portion, and a cam portion connected to the fishing line receiving portion. The ballast portion includes the center of gravity of the apparatus. Portions of the ballast portion, the fishing line receiving portion, and the cam portion are arrayed along a longitudinal axis. A free-end, pole-contacting portion of the cam portion extends laterally to a first side of the longitudinal axis; and an intermediate, pole-contacting portion of the cam portion extends laterally to a second side of the longitudinal axis. The fishing line receiving portion includes a line cam surface adapted to slide against a taut fishing line. Also, the fishing line receiving portion includes notch portions adapted to engage a portion of a slack fishing line. The notch portions of the fishing line receiving portion extend longitudinally along the longitudinal axis.

An audible sounding device is optionally located on the ground below the ballast portion, the fishing line receiving portion, and the cam portion. When these components undergo free fall when a fish has struck the fishing line, the audible sounding device provides an audible signal to a fisherman that the fishing line has been struck.

An adjustable weight assembly is connected to the ballast portion. The adjustable weight assembly includes a connector for connecting to the ballast portion, a tether assembly connected to the connector, and a weight unit is connected to the tether assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing strike indicator apparatus which has all of the advantages of the prior art and none of the disadvantages.

It is another object of the present invention to provide a new and improved fishing strike indicator apparatus which may be easily and efficiently manufactured and marketed.

It is a further object of the present invention to provide a new and improved fishing strike indicator apparatus which is of durable and reliable construction.

An even further object of the present invention is to provide a new and improved fishing strike indicator apparatus which is susceptible of a low cost of manufacture with regard to both materials and labor, and which accordingly is then susceptible of low prices of sale to the consuming public, thereby making such fishing strike indicator apparatus available to the buying public.

Still yet a further object of the present invention is to provide a new and improved fishing strike indicator apparatus which is non-intrusive, that is, free of complex connecting elements for connecting a fish strike alert to a fishing pole.

Still another object of the present invention is to provide a new and improved fishing strike indicator apparatus that is free of electrical components.

Yet another object of the present invention is to provide a new and improved fishing strike indicator apparatus which does not require the use of moving parts.

Even another object of the present invention is to provide a new and improved fishing strike indicator apparatus that is associated with a fishing line before a fish strikes and disengages from the fishing line after a fish strikes.

Still a further object of the present invention is to provide a new and improved fishing strike indicator apparatus which is able to float on water if the device inadvertently falls into the water.

Yet another object of the present invention is to provide a new and improved fishing strike indicator apparatus that can provide an audible signal in addition to a visual signal.

Still a further object of the present invention is to provide a new and improved fishing strike indicator apparatus which can permit a fisherman to locate himself in a desired location than would otherwise be possible, e.g. the fisherman does not have to constantly watch his line—he can face away from the sun or the wind as long as his fishing pole remains in his peripheral field of awareness.

Yet still another object of the present invention is to provide a new and improved fishing strike indicator apparatus which takes only a relatively brief period of time to reset the fish strike alert indicator for the ensuing fishing cycle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a partial side view of a second embodiment of the invention showing a variable weight attachment.

FIG. 6 is an enlarged bottom view of the embodiment of the invention shown in FIG. 5.

DESCRIPTION OF THE PREFERRED EMBODIMENT

Figure 1:
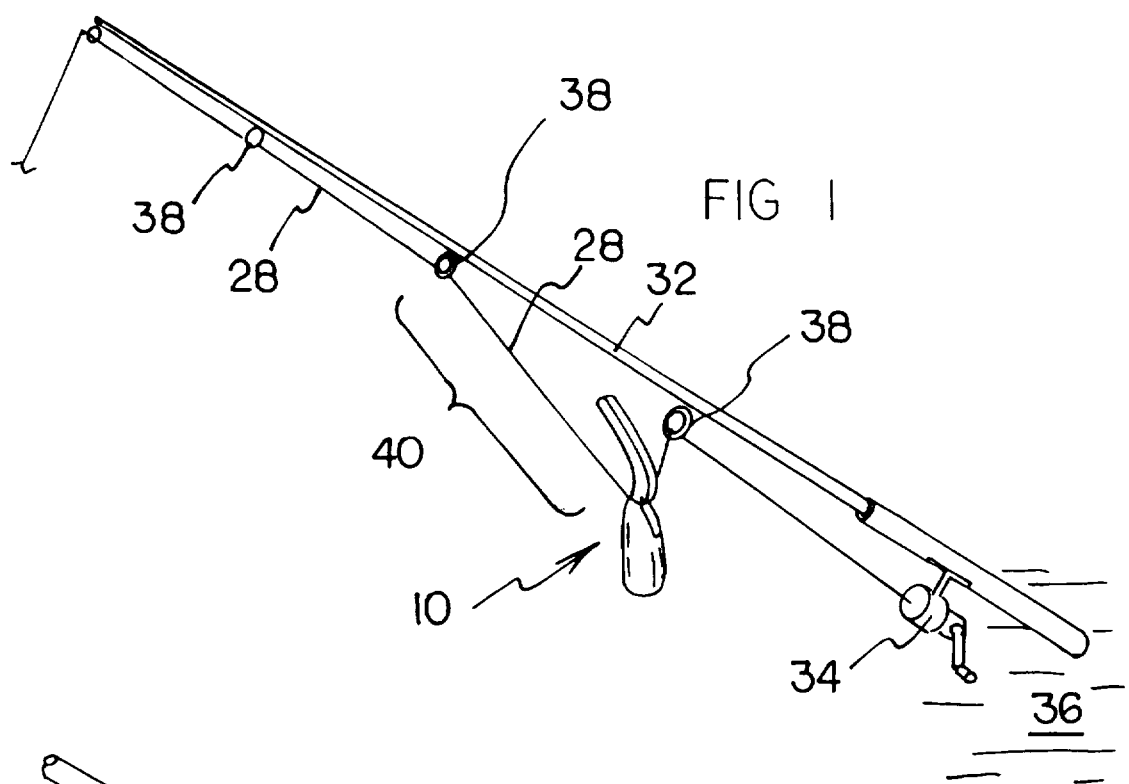
FIG. 1 is a perspective view showing a first embodiment of the fishing strike indicator apparatus of the invention hanging from a slack fishing line before a fish strikes.

With reference to the drawings, a new and improved fishing strike indicator apparatus embodying the principles and concepts of the present invention will be described.

Turning to FIGS. 1–4, there is shown a first embodiment of the fishing strike indicator apparatus of the invention generally designated by reference numeral 10. In its preferred form, fishing strike indicator apparatus 10 includes a ballast portion 12, a fishing line receiving portion 14 connected to the ballast portion 12, and a cam portion 16 connected to the fishing line receiving portion 14. The ballast portion 12 includes the center of gravity 20 of the apparatus, and portions of the ballast portion 12, the fishing line receiving portion 14, and the cam portion 16 are arrayed along a longitudinal axis 18. A free-end, pole-contacting portion 22 of the cam portion 16 extends laterally to a first side of the longitudinal axis 18, and an intermediate, pole-contacting portion 24 of the cam portion 16 extends laterally to a second side of the longitudinal axis 18. The fishing line receiving portion 14 includes a line cam surface 26 adapted to slide against a taut fishing line 28. Also, the fishing line receiving portion 14 includes notch portions 30 adapted to engage a portion of a slack fishing line 28. The notch portions 30 of the fishing line receiving portion 14 extend longitudinally along the longitudinal axis 18.

In operation, the fishing strike indicator apparatus 10 of the invention is used in conjunction with a fishing pole 32 and a fishing line 28. The fishing line 28 can be connected to a reel 34, and the fishing pole 32 is fixed to some sort of static structure, such as the ground 36. The fishing pole 32 has ferrules 38 which guide the fishing line 28 along the fishing pole 32.

In FIG. 1, the fishing strike indicator apparatus 10 of the invention is shown in a monitor mode. In the monitor mode, the fishing line 28 has a slack portion 40. The fishing strike indicator apparatus 10 hangs from the slack portion 40 of the fishing line 28 by placing the fishing line receiving portion 14 of the fishing strike indicator apparatus 10 on the slack portion 40. When the slack portion 40 of the fishing line 28 is in contact with the fishing line receiving portion 14, portions of the fishing line 28 rest in the notch portions 30 of the fishing line receiving portion 14. In the monitor mode, no portion of the fishing strike indicator apparatus 10 is in contact with the fishing pole 32.

Figure 2:
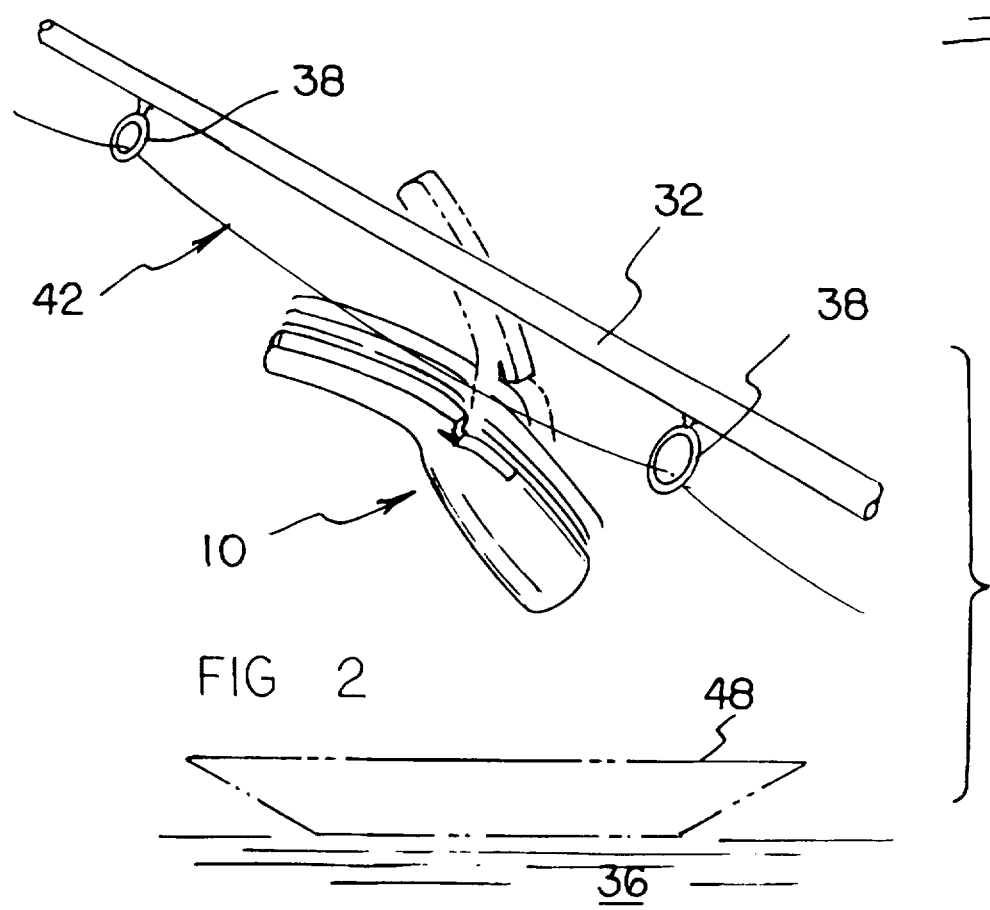
FIG. 2 is an enlarged perspective view of the embodiment of the invention shown in FIG. 1 after a fish has struck the line and after the slack in the fishing line is removed, whereby the fishing strike indicator apparatus of the invention had just been knocked off the fishing line.
Figure 3:
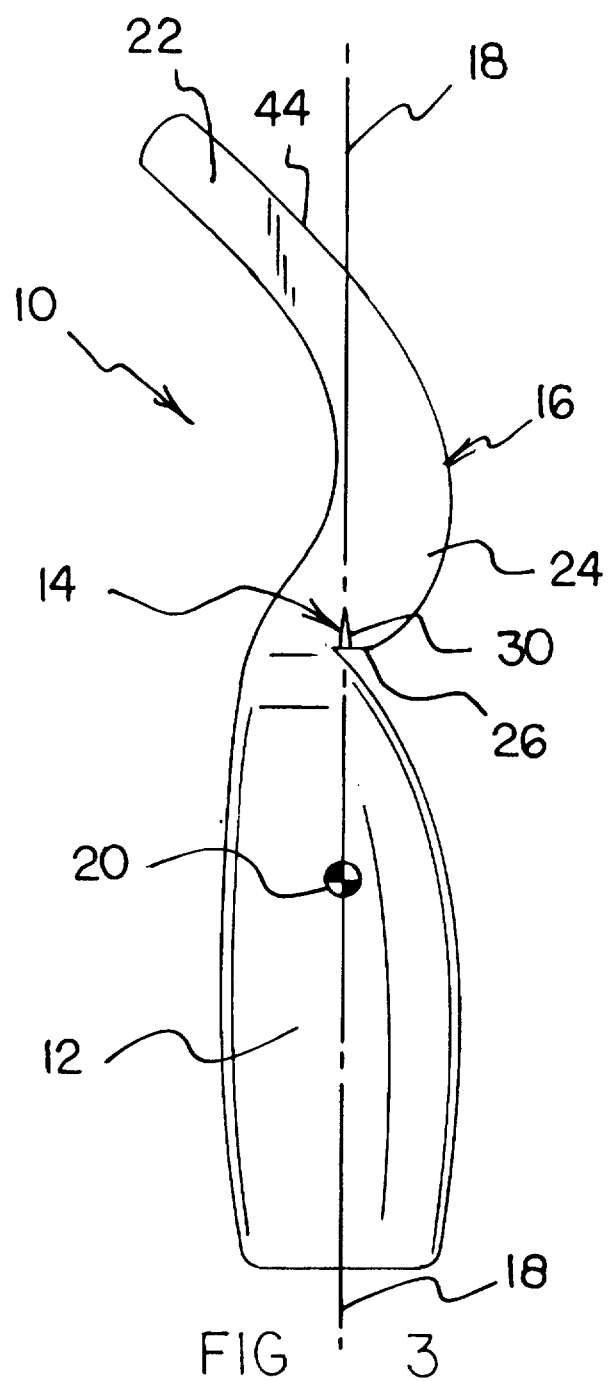
FIG. 3 is a side view of the embodiment of the fishing strike indicator apparatus of FIGS. 1 and 2 removed from the fishing line.
Figure 4:
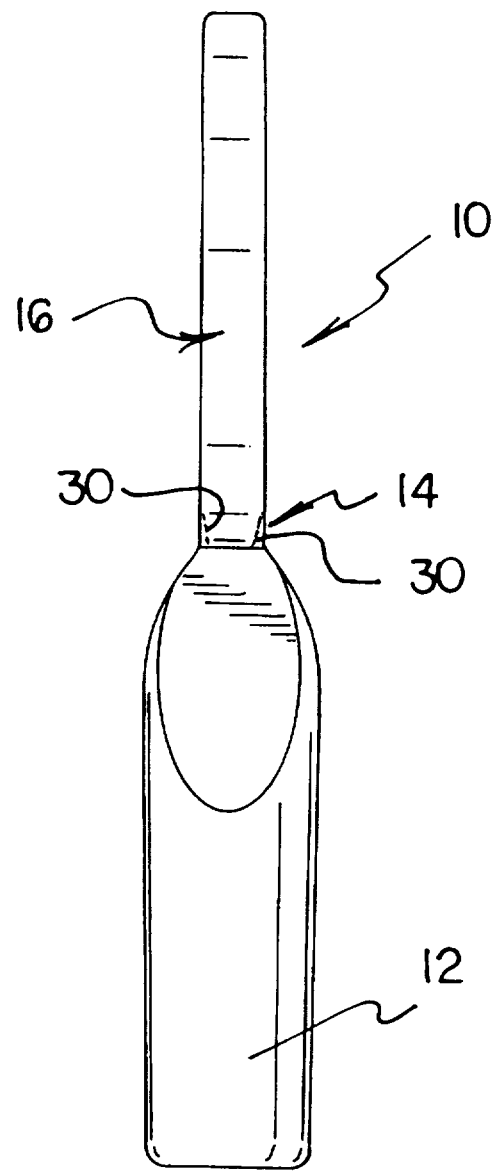
FIG. 4 is a front view of the embodiment of the invention shown in FIG. 3.

When a fish strikes the fishing line 28, the slack portion 40 is pulled taut to become taut portion 42 as shown in FIG. 2. As the fishing line 28 is pulled taut, the portions of the slack fishing line 28 that were resting in the notch portions 30 of the fishing line receiving portion 14 are pulled out of the notch portions 30. Also, as the fishing line 28 is pulled taut, the free-end, pole-contacting portion 22 of the cam portion 16 comes into contact with the fishing pole 32. This is shown in broken lines in FIG. 2. The upper surface 44 of the free-end, pole-contacting portion 22 slides against the fishing pole 32 causing the entire fishing strike indicator apparatus 10 to rotate around the fishing line receiving portion 14. As the entire fishing strike indicator apparatus 10 rotates around the fishing line receiving portion 14, in a very short time, the orientation of the line cam surface 26 of the fishing line receiving portion 14 reaches an orientation with respect to the taut portion 42 of the fishing line 28 such that the line cam surface 26 slides off of the taut portion 42. When the line cam surface 26 slides off of the taut portion 42 of the fishing line 28, the fishing strike indicator apparatus 10 begins a free fall away from the fishing pole 32. This is shown in the solid lines in FIG. 2.

When a fisherman looks at the fishing pole 32 and fishing line 28 as the fishing strike indicator apparatus 10 is falling away from the fishing pole 32 and the fishing line 28, such a falling apparatus provides a visual indication that a fish has struck the line. Alternatively, if after the fishing strike indicator apparatus 10 has fallen to the ground 36. A fisherman looks at the fishing pole 32, the absence of the fishing strike indicator apparatus 10 from the fishing line 28 and fishing pole 32 provides a visual indication that a fish has struck the line.

The presence of the center of gravity 20 of the fishing strike indicator apparatus 10 in the ballast portion 12 assures that the cam portion 16 is oriented for contact with the fishing pole 32 when the fishing line 28 is pulled taut.

As shown in FIG. 2 in broken lines, audible sounding device 48 is optionally located on the ground 36 below the ballast portion 12, the fishing line receiving portion 14, and the cam portion 16. The ballast portion 12, the fishing line receiving portion 14, and the cam portion 16 fall and impact the audible sounding device 48 to provide an audible signal to the fisherman that the fishing line 28 has been struck. The audible sounding device 48 is shown to be an aluminum pie pan.

Turning to FIGS. 5 and 6, a second embodiment of the invention is shown. Reference numerals are shown that correspond to like reference numerals that designate like elements shown in the other figures. In addition, adjustable weight assembly 50 is connected to the ballast portion 12. The adjustable weight assembly 50 includes a connector 52 for connecting to the ballast portion 12. A tether assembly 54 is connected to the connector 52, and a weight unit 56 is connected to the tether assembly 54. The added weight unit 56 causes the center of gravity to be lowered to the second center of gravity position 21 shown in FIG. 5. Moreover, the tether assembly 54 is comprised of chain-like links 58. As a result, the weight unit 56 can swing back and forth like a pendulum, as shown by an alternate position of the weight unit 56 shown in broken lines in FIG. 6. If desired, different weight units 56 can be added to fine tune operation of the fishing strike indicator apparatus 10 of the invention.

It will be appreciated that the fish strike indicator of the present invention may be quickly reset on the line for the next fishing cycle in as a brief a period as say, about 5 seconds, for example. Further, in order to avoid losing the fish strike indicator apparatus 10 after it has free fallen from the line to which it was attached, a flexible tether (not illustrated) may have one end suitably attached to the apparatus 10 while the other end of the tether may be suitably anchored to a rock or tree located proximal to where the fisherman is positioned. Suitable tether materials include string, nylon fishing tackle, and so on.

The components of the fishing strike indicator apparatus of the invention can be made from inexpensive and durable wood and plastic materials. Preferably, the materials are less dense than water and will, therefore, float on water.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing strike indicator apparatus that is low in cost, relatively simple in design and operation, and which is free of complex connecting elements for connecting a fish strike alert to a fishing pole. With the invention, a fishing strike indicator apparatus is provided which is free of electrical components. With the invention, a fishing strike indicator apparatus is provided which does not require the use of moving parts. With the invention, a fishing strike indicator apparatus is provided which is associated with a fishing line before a fish strikes and disengages from the fishing line after a fish strikes. With the invention, a fishing strike indicator apparatus is provided which is able to float on water if the device inadvertently falls into the water. With the invention, a fishing strike indicator apparatus is provided which can provide an audible signal in addition to a visual signal. With this invention a fishing strike indicator is provided which can permit the fisherman to be in a desired location than would otherwise be possible, e.g. the fisherman does not have to constantly watch his line—he can face away from the sun or the wind as long as his fishing pole remains in his peripheral field of awareness. With this invention a fishing strike indicator is provided which takes a relatively brief period of time to reset the fish strike alert for the next fishing cycle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A fishing strike indicator apparatus, comprising:
   a ballast portion,
   a fishing line receiving portion connected to said ballast portion,
   a cam portion connected to said fishing line receiving portion, and
   an audible sounding device, located on a ground portion below said ballast portion, said fishing line receiving portion, and said cam portion which fall and impact said audible sounding device to provide an audible signal,
   wherein said ballast portion includes a center of gravity of the apparatus,
   wherein portions of said ballast portion, said fishing line receiving portion, and said cam portion are arrayed along a longitudinal axis, and
   wherein a free-end, pole-contacting portion of said cam portion extends laterally to a first side of said longitudinal axis, and wherein an intermediate, pole-contacting portion of said cam portion extends laterally to a second side of said longitudinal axis.

2. The apparatus of claim 1 wherein said fishing line receiving portion includes a line cam surface adapted to slide against a taut fishing line.

3. The apparatus of claim 1 wherein said fishing line receiving portion includes a notch portion adapted to engage a portion of slack fishing line.

4. The apparatus of claim 3 wherein said notch portion of said fishing line receiving portion extends longitudinally along said longitudinal axis.

5. The apparatus of claim 1 wherein said fishing line receiving portion includes plural notch portions adapted to engage portions of slack fishing line.

6. The apparatus of claim 5 wherein said plural notch portions of said fishing line receiving portion extend longitudinally along said longitudinal axis.

7. A fishing strike indicator apparatus, comprising:
   a ballast portion,
   a fishing line receiving portion connected to said ballast portion,
   a cam portion connected to said fishing line receiving portion, and
   an adjustable weight assembly connected to said ballast portion
   wherein said ballast portion includes a center of gravity of the apparatus,
   wherein portions of said ballast portion, said fishing line receiving portion, and said cam portion are arrayed along a longitudinal axis,
   wherein a free-end, pole-contacting portion of said cam portion extends laterally to a first side of said longitudinal axis, and wherein an intermediate, pole-contacting portion of said cam portion extends laterally to a second side of said longitudinal axis, and
   wherein said adjustable weight assembly includes:
   a connector connected to said ballast portion,
   a tether assembly connected to said connector, and
   a weight unit connected to said tether assembly.

* * * * *